March 29, 1960   P. C. CONSOLETTI   2,930,417
SAW CHAIN
Filed Feb. 24, 1958
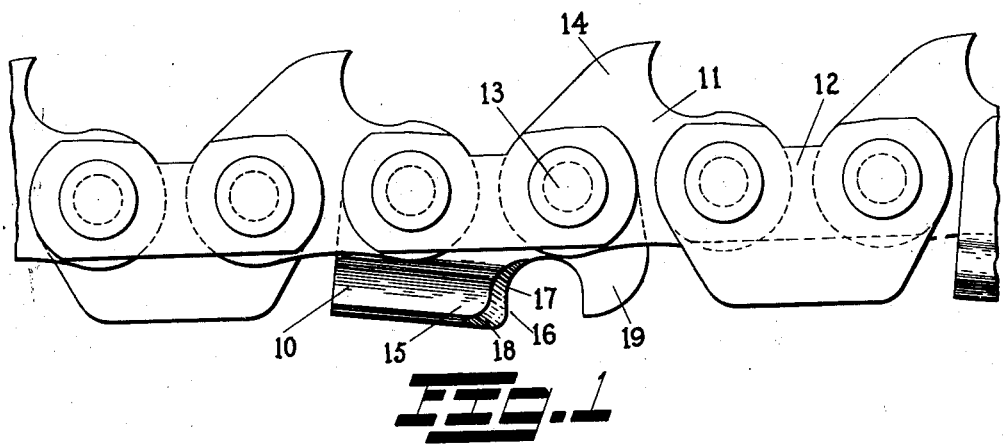
Fig. 1
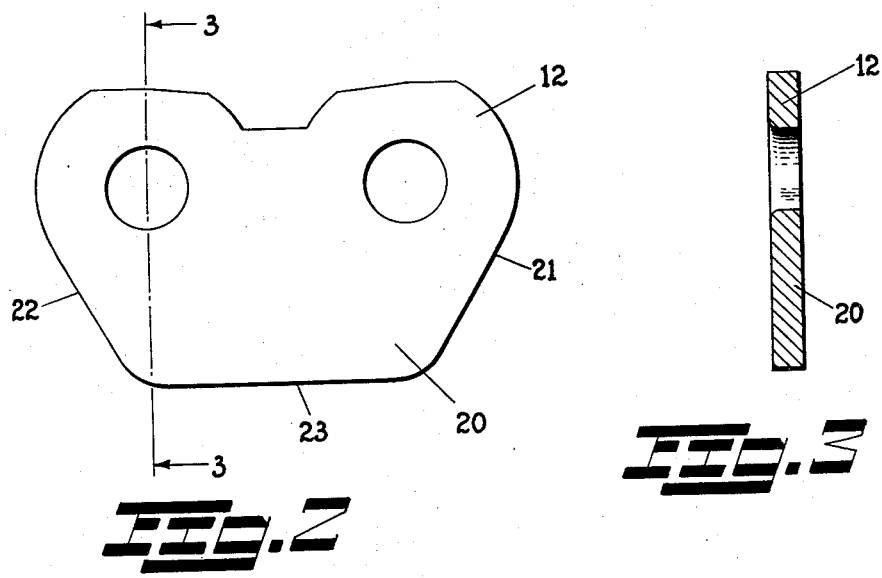
Fig. 2
Fig. 3
INVENTOR.
PAUL C. CONSOLETTI
BY
*Rodney C. Southworth*
ATTORNEY

United States Patent Office 2,930,417
Patented Mar. 29, 1960

2,930,417

SAW CHAIN

Paul C. Consoletti, Milford, Mass., assignor to Draper Corporation, Hopedale, Mass., a corporation of Maine Application February 24, 1958, Serial No. 717,033

4 Claims. (Cl. 143—135)

This invention pertains to improvements in saw chains and more particularly, to improvements in certain links thereof for the purpose of stabilizing the operation of the chain.

It is a general object of the invention to improve the operating characteristics of chain saws, especially when such saws are used in limbing or in cutting smaller logs or lumber in which a short length of the chain bears upon the material being cut or when cutting hard or frozen timber, at least during some part of its action thereon.

A further and more specific object is that of providing a saw chain in which means is provided for limiting the extent of movement of those lnks intermediate cutter links toward the bottom of a kerf being cut.

Other objects will appear from the following more detailed disclosure.

Saw chains of the type herein concerned have various types of links which include cutter links, guide links and connecting links the cutter links having a cutter or router forming a portion of the link and also, a depth gauge which precedes the cutter and limits the depth to which it may cut into the material being sawed. The general purpose and mode of operation of these parts are well known and are explained in United States Patent No. 2,632,484 so that no further explanation of the chain in general need be given here. In use, a cutting chain of this sort has bearing at the bottom of the kerf in the material being cut only at points defined by the cutters themselves and their depth gauges so that a considerable span of chain remains unsupported. Specifically, this span includes the space from one depth gauge to the preceding cutter or nearly two connecting links plus a guide link (as measured from pivot centers). This does not cause any serious trouble when the chain is cutting in a kerf of considerable length, but when cutting a small limb of a tree or any other material in which the length of kerf at the moment is very short, this gap in support or contact between the saw elements and the material causes jumping, chatter or other undesirable action. This occurs most noticeably when starting the cut. Of course, the result is an immediate loss of efficiency in the cutting tool, but also, it sets up strain in the parts which shorten the life thereof and therefore, this is a shortcoming of the saw chain which it becomes very desirable to alleviate.

According to the invention, the above mentioned problem finds its solution in an added "support" or movement limiting means preferably comprised as a plate-like extension to certain spaced connecting links. By means of these extensions which are preferably shorter than either the cutters or the depth gauges, the chain is supported at points so closely spaced along its length that it runs smoothly even though the kerf being cut at the moment is of very limited extent.

The novel chain is provided with cutter links including cutting means comprised as allochiral routers thereon, a depth gauge preceding each of said cutter means, said links being interspaced by series of alternating guide links and connecting links, means including rivets about which said links are articulated, the leading edge of an interspaced depth gauge and the trailing edge of a preceding cutter means defining a span therebetween equal to the distance between three link articulations or less, and means for stabilizing the action of said chain for limiting the movement of that part of the chain at said span toward the bottom of a kerf being cut by said chain which includes a plate-like extension projecting toward the bottom of said kerf for a distance less than the extent of said cutting means and from one link of each of said series, said extension having a lower non-cutting surface substantially parallel to the length of said chain which surface is of such extent as to divide said span into segments each of which is less than the distance between adjacent link articulations, said surface further being generally centrally disposed in said span.

The invention will be described in greater detail by reference to the accompanying figures of drawing, wherein:

Fig. 1 is a side view of a chain to which the invention is applied.

Fig. 2 is an enlarged detail view of a connecting link according to the invention.

Fig. 3 is a section at line 3—3, Fig. 2.

Now referring to Fig. 1, a chain of a type to which the invention may be applied is comprised of cutter or router links 10, center or guide links 11, connecting or side links 12 and rivets 13 by which all links are connected to make up the chain. Each center link has a tongue 14 by which the chain is constrained to follow a path about the periphery of a grooved guide bar and also, through which the chain is driven by its sprocket. Side links 12 serve as connecting means between center links and also supplement the cutter links, which, of course, are arranged alternately at the left and right sides of the chain.

Each cutter link has a cutter or router projection 15 which terminates in a tooth 16 sharpened at both the side portion 17 and the bottom or transverse portion 18. The specific shape of these cutting teeth and manner of sharpening may be varied but preferably follow some one of the accepted practices in this art.

Each cutter link 10 also has projecting therefrom a depth guage 19 which precedes the cutter and is of slightly less length so as to limit the depth of cut of the latter. These depth gauges are of the same stock and consequently the same thickness as the link of which they form a part, and normally run along the kerf in advance of their cutter bearing on some particular portion of the kerf.

One of the connecting links 12 which span the space between guide links is specially shaped or provided with a projection 20, Figs. 2 and 3. This is referred to as a plate-like extension although it need not be of as great extent as herein shown. Preferably it is formed with inclined ends 21 and 22 which round off at their lower extremities to curve into a lower surface 23 parallel to the length of the chain. The length of this extension should preferably be somewhat less than that of the following depth guage, e.g., one thirty-second (1/32) of an inch. At least it should be short enough so that when cutting at the part of the chain rounding the guide bar end, as when boring, these members 20 would not hold the cutting teeth away from the wood.

Pereferably, the arrangement is one in which the plate-like projection is to be found at one connecting link 12 only; and their positions should alternate from right to left. This arrangement is further governed by the fact a projection following a cutter 15 will interfere with the chips less if it is staggered to the opposite side of the saw from the side on which the tooth is found. This preferred positioning of parts is, however, not entirely essential and, it is to be borne in mind that the disposition of the extensions, their particular shape and dimensions and especially their length, may be varied within rather wide limits without sacrifice of effectiveness such as would render the improvement unsatisfactory.

In operation a saw employing this chain may be used to cut limbs from a tree trunk or to cut other small pieces of wood or other material without fear of its jumping or chattering as heretofore has frequently happened. Probably much of that undesired action has arisen due to the fact the small piece to be cut permits the chain to fall too low or to put it another way, the piece to be cut may tend to approach too closely to the center line of the chain after a cutter passes and prior to a following depth gauge hitting the material. The depth gauge is then approaching the cut too deeply positioned and strikes the piece with a blow. It is recognized that at the speed these saws are operated, this should not happen, but in practice it does and with the present invention the undesired action is largely eliminated. The stabilizing projections not only prevent the chain from jumping but also cause it to run with less tendency of the guide links to dip or rise, that is, the pivot centers all follow nearly the theoretically accurate path in which they should move.

While the use of the saw in cutting smaller pieces has been stressed, it is to be understood that the invention is by no means limited to that use, but is still very well adapted to all the other and usual tasks to which these saws may be put.

By the term "distance between three link articulations or less" in the specification and claims is meant the distance between extreme points of articulation of two adjacent links, or, in other words, two pitches or twice the distance between rivet centers.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. A saw chain having cutter links including cutting means comprised as allochiral routers thereon, a depth gauge preceding each of said cutting means, said links being interspaced by series of alternating guide links and connecting links, means including rivets about which said links are articulated, each pair of consecutive cutter links defining a span therebetween, and means for stabilizing the action of said chain for limiting the movement of said links toward the bottom of a kerf being cut by said chain which includes a plate-like extension projecting toward the bottom of said kerf and from one link of each of said series, said extension having a lower non-cutting surface substantially parallel to the length of said chain, said surface extending over the major portion of said span.

2. The saw chain as defined in claim 1 wherein said extensions alternate at first one side of said chain and then the other so as to immediately follow a cutter link at the same side of the chain as that extension.

3. A saw chain having cutter links including cutting means comprised as allochiral routers thereon, a depth gauge preceding each of said cutting means, said links being interspaced by series of alternating guide links and connecting links, means including rivets about which said links are articulated, an interspaced depth gauge and a preceding cutter means defining a span therebetween, and means for stabilizing the action of said chain for limiting the movement of that part of the chain at said span toward the bottom of a kerf being cut by said chain which includes a plate-like extension projecting toward the bottom of the kerf for a distance less than the extent of said cutting means and from one link of each said series, said extension having a lower non-cutting surface substantially parallel to the length of said chain which surface is of such extent as compared to the extent of said span that no expanse thereof greater than the distance between adjacent link articulations is left unsupported.

4. A saw chain having cutter links including cutting means comprised as allochiral routers thereon, a depth gauge preceding each of said cutter means, said links being interspaced by series of alternating guide links and connecting links, means including rivets about which said links are articulated, the leading edge of an interspaced depth gauge and the trailing edge of a preceding cutter means defining a span therebetween equal to the distance between three link articulations or less, and means for stabilizing the action of said chain for limiting the movement of that part of the chain at said span toward the bottom of a kerf being cut by said chain which includes a plate-like extension projecting toward the bottom of said kerf for a distance less than the extent of said cutting means and from one link of each of said series, said extension having a lower non-cutting surface substantially parallel to the length of said chain which surface is of such extent as to divide said span into segments each of which is less than the distance between adjacent link articulations, said surface further being generally centrally disposed in said span.

References Cited in the file of this patent

UNITED STATES PATENTS

| | | |
|---|---|---|
| 2,446,774 | Mall | Aug. 10, 1948 |
| 2,508,784 | Cox | May 23, 1950 |
| 2,558,678 | Garrett | June 26, 1951 |
| 2,589,015 | Merz | Mar. 11, 1952 |
| 2,826,226 | Donley | Mar. 11, 1958 |
| 2,872,956 | Gudmunsen | Feb. 10, 1959 |

Notice of Adverse Decision in Interference

In Interference No. 92,217 involving Patent No. 2,930,417, P. C. Consoletti, Saw chain, final judgment adverse to the patentee was rendered Mar. 3, 1964, as to claims 3 and 4.

[*Official Gazette April 28, 1964.*]